United States Patent
Zhao

(10) Patent No.: US 10,261,877 B2
(45) Date of Patent: Apr. 16, 2019

(54) SYSTEMS AND METHODS FOR TESTING MOBILE DEVICES

(71) Applicant: Silead Inc., Shanghai (CN)

(72) Inventor: Wenheng Zhao, Shanghai (CN)

(73) Assignee: SILEAD INC., Shanghai (CN)

( * ) Notice: Subject to any disclaimer, the term of this patent is extended or adjusted under 35 U.S.C. 154(b) by 120 days.

(21) Appl. No.: 15/239,539

(22) Filed: Aug. 17, 2016

(65) Prior Publication Data

US 2018/0018249 A1  Jan. 18, 2018

(30) Foreign Application Priority Data

Jul. 14, 2016 (CN) .......................... 2016 1 0552708

(51) Int. Cl.
*G06F 11/00* (2006.01)
*G06F 11/263* (2006.01)
*G06F 3/0484* (2013.01)
*G06F 17/30* (2006.01)

(52) U.S. Cl.
CPC ........ *G06F 11/263* (2013.01); *G06F 3/04842* (2013.01); *G06F 3/04847* (2013.01); *G06F 17/30896* (2013.01); *G06F 17/30908* (2013.01)

(58) Field of Classification Search
CPC .................................................... G06F 11/263
See application file for complete search history.

(56) References Cited

U.S. PATENT DOCUMENTS

| | | | | |
|---|---|---|---|---|
| 7,539,981 B2 * | 5/2009 | Eilebrecht | ............... | G06F 8/423 717/106 |
| 8,176,167 B2 * | 5/2012 | Fok | ......................... | H04L 43/00 455/466 |
| 8,943,184 B2 * | 1/2015 | Kothe | .................. | H04L 41/0266 709/223 |
| 8,959,123 B2 * | 2/2015 | Arthursson | ......... | G06F 9/45504 707/602 |
| 9,378,109 B1 * | 6/2016 | Phadke | ............... | G06F 11/2221 |
| 2011/0093619 A1 * | 4/2011 | Nelson | ................... | G06Q 10/06 709/248 |
| 2012/0016913 A1 * | 1/2012 | Tamm | ............... | G06F 17/30442 707/805 |
| 2017/0031801 A1 * | 2/2017 | Chang | ................. | G06F 9/45529 |

* cited by examiner

*Primary Examiner* — Christopher S McCarthy
(74) *Attorney, Agent, or Firm* — HA

(57) ABSTRACT

Systems and methods for testing mobile device s are disclosed. In an embodiment, a mobile device testing system comprises a non-transitory memory and one or more hardware processors coupled to the non-transitory memory. The one or more hardware processors execute instructions to perform operations that include receiving a command XML sheet and rendering the command XML sheet into a user interface application, wherein the command XML sheet comprises elements corresponding to one or more commands for testing a mobile device.

18 Claims, 8 Drawing Sheets

SYSTEMS AND METHODS FOR TESTING MOBILE DEVICES

PRIORITY

This claims the benefit of Chinese patent application serial No. 201610552708.7, entitled "Systems and Methods for Testing Mobile Devices," filed Jul. 14, 2016, herein incorporated by reference in its entirety.

TECHNICAL FIELD

The present disclosure generally relates to mobile devices. More particularly, but not by way of limitation, the present disclosure relates to systems and methods for testing mobile devices such as smart phones. As used in the present disclosure, a mobile device refers to a portable device having at least one processor and a non-transitory memory. The mobile device may or may not have a graphical display, although generally they have a graphical display such as a touch screen. Examples of mobile devices include mobile phones, personal digital assistants (PDAs), portable media players, and portable GPS navigation units. The testing of a mobile phone is used as an example in the present disclosure. However, the same inventive concept may be applied to the testing of other types of mobile devices.

BACKGROUND

As mobile devices continue developing, testing of the mobile devices becomes more and more complex. For example, mobile device manufacturers (factories) generally deploy some special or proprietary testing software, which is not reused or shared among factories. This increases the overall manufacturing costs. For each new-generation mobile devices, new testing software generally needs to be developed, including testing code (source code and object code) and testing interface (or testing user interface). Further, adding a test command or test item frequently requires modifying the testing interface and recompiling the source code, which makes it difficult to maintain the testing software. Still further, testing results (outputs of the testing software) are usually stored locally in the mobile devices or in a computer performing the tests, making it difficult for collecting testing data for statistics.

In addition to the complexity in the factories, testing of mobile devices during research and development (R&D) phase also becomes more complex. During this phase, testing is typically isolated and not collaborated. Oftentimes, testing is performed manually through the testing user interface and test automation is seldom used. At the same time, any specially created test code needs to be specifically maintained, increasing the research and maintenance costs.

Still further, diagnosing and testing mobile devices after sales becomes more complex. When issues arise after sales, it is difficult to remotely diagnose a mobile device that is in the customer's hand or on the customer's premise. Sometimes, a test engineer may need to be on site with the customer to examine the mobile device, which is expensive for the mobile device provider. Further, some issues may be beyond the knowledge or skills of one test engineer and may require a testing team's collaborate effort.

Accordingly, it is desirable to have improvements in testing systems, testing methodologies, and testing architectures for simplifying the testing of mobile devices.

SUMMARY

The present disclosure relates to systems and methods for testing mobile devices such as a mobile phone or a smart phone. An object of the present disclosure is to provide systems and methods that are reusable from tests to tests; scalable for local testing, remote testing, and factory testing; and sharable between mobile device manufacturers.

According to an embodiment of the present disclosure, a mobile device testing system comprises a non-transitory memory and one or more hardware processors coupled to the non-transitory memory. The one or more hardware processors execute instructions to perform operations that include receiving a command XML (XML stands for Extensible Markup Language) sheet and rendering the command XML sheet into a user interface application, wherein the command XML sheet comprises elements corresponding to one or more commands. The commands may be for testing a device (testing commands) and/or for operating a device (operational commands) In an embodiment, the elements comprise a name element and an argument element for each of the commands. The elements may further comprise a result element for each of the commands. In embodiments, the non-transitory memory and the one or more hardware processors may reside in a mobile device under testing (or a device under test (DUT)) or in a tester device which communicates with a DUT through a network. Using XML to organize commands and rendering the XML into a user interface simplifies the code maintenance tasks, thus maintenance-free.

In an embodiment, the operations further include receiving a user input through the user interface application for performing one of the commands and executing the one of the commands in response to the user input. The user may execute one command at a time or multiple commands in a batch. In a further embodiment, the operations include generating a file message having information contained in the command XML sheet; generating a command message for locating the one of the commands in the file message; and interpreting the command message using the file message, thereby producing the one of the commands. The file message and command message may be passed from a tester device to a DUT in a client/server network where the DUT is the server for executing the command(s), and the tester device is a computer operated by a test engineer. This enables the testing of the DUT in factory or during research and development phase.

In a further embodiment, test results are passed from DUT to a tester device and are used for updating a display on the user interface application and for updating a result XML file. The result XML file may be sent to a statistics server for the purposes of creating and updating a database. Factory personnel may query the database to keep abreast of the testing status.

According to another aspect of the present disclosure, a computer-implemented method for testing a mobile device is disclosed. The method includes receiving a command XML sheet and rendering the command XML sheet into a user interface application, wherein the command XML sheet comprises elements corresponding to one or more commands. In an embodiment, the method further includes receiving a user input through the user interface application for performing one of the commands and executing the one of the commands in response to the user input. In a further embodiment, the method further includes generating a file message and a command message, wherein the file message includes information contained in the command XML sheet and the command message locates the one of the commands in the file message. The method may further include receiving a result of the execution of the one of the commands, and updating a display on the user interface application in response to the result. The method may additionally or alternatively update a result XML sheet with the result and stores the result XML sheet in a non-transitory memory. In still another embodiment, the method includes converting the result XML sheet into at least one entry in a relational database.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one having ordinary skill in the art from the following detailed description.

BRIEF DESCRIPTION OF THE DRAWINGS

The accompanying drawings illustrate embodiments of the systems and methods disclosed herein and together with the description, serve to explain the principles of the present disclosure.

DETAILED DESCRIPTION

Figure 1:
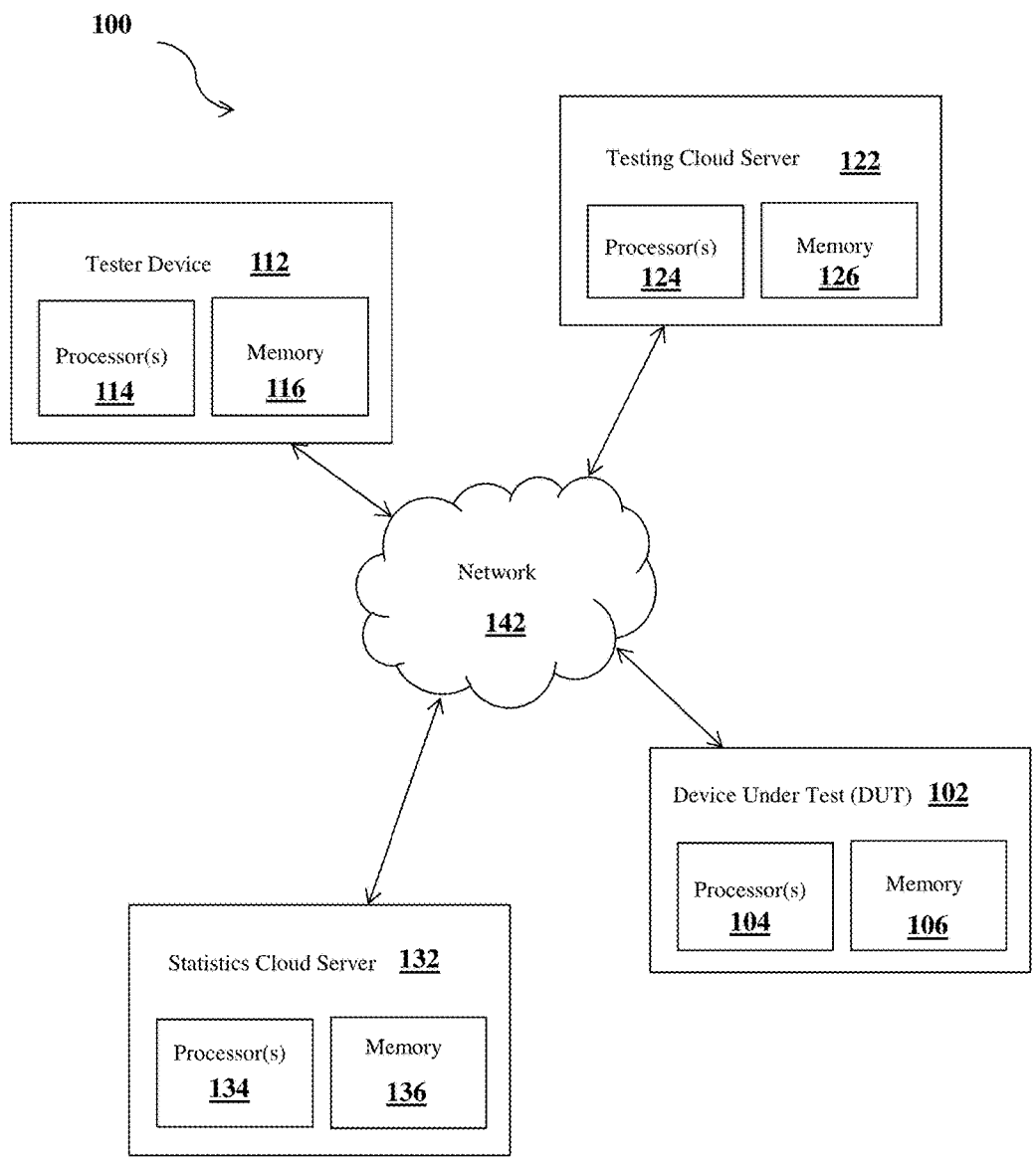
FIG. 1 is a schematic view of an embodiment of a mobile device testing system, constructed according to aspects of the present disclosure.

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one having ordinary skill in the art to which the disclosure relates. For example, the features, components, and/or steps described with respect to one embodiment may be combined with the features, components, and/or steps described with respect to other embodiments of the present disclosure to form yet another embodiment of a device, system, or method according to the present disclosure even though such a combination is not explicitly shown. Further, for the sake of simplicity, in some instances the same reference numerals are used throughout the drawings to refer to the same or like parts.

FIG. 1 is a schematic view of an embodiment of a mobile device testing system 100, constructed according to aspects of the present disclosure. Referring to FIG. 1, the system 100 includes various components interconnected through a network. More specifically, the system 100 includes a device under test (DUT) 102 which is a target device for one or more tests or operations to be performed thereon or therein, a tester device 112 which is used for testing or operating the DUT 102, an optional testing cloud server 122 which may host a website for testing, and an optional statistics cloud server 132 which may store test results in a database for query. The components 102, 112, 122, and 132 are interconnected through a network 142.

Still referring to FIG. 1, each of the components 102, 112, 122, and 132 includes one or more processors and a memory. More specifically, the DUT 102 includes one or more processors 104 and a memory 106; the tester device 112 includes one or more processors 114 and a memory 116; the testing cloud server 122 includes one or more processors 124 and a memory 126; and the statistics cloud server 132 includes one or more processors 134 and a memory 136. In an embodiment, the DUT 102 and the tester device 112 physically reside in one device—the mobile device to be tested. To further this embodiment, the processors 104 and 114 may be the same processor, and the memories 106 and 116 may be the same memory media. In another embodiment of the system 100, one or both of the testing cloud server 122 and the statistics cloud server 132 may be omitted. The various components of the system 100 are further described in details below.

The DUT 102 is a mobile device such as a mobile phone or a smart phone in the present embodiment. Examples of mobile phones include Apple Inc.'s iPhone series, Samsung Electronics' Galaxy series, Google Inc.'s Nexus series, as well as mobile phones manufactured by other companies such as Huawei and Xiaomi Inc. The DUT 102 may be other types of mobile devices such as a personal digital assistant (PDA), a portable media player, or a portable GPS navigation unit in various embodiments. In an embodiment, the DUT 102 is an unfinished product. For example, the DUT 102 does not yet have a display (e.g., a touch screen) attached thereto because it is desirable to test the DUT 102 before a display is installed in order to save manufacturing costs. The DUT 102 performs specific operations by the processor 104 and other components (not shown) by executing one or more sequences of instructions contained in the memory 106. Instructions may also be referred to as code. The terms "instructions" and "code" should be interpreted broadly to include any type of computer-readable statement(s). For example, the terms "instructions" and "code" may refer to one or more software applications, programs, routines, sub-routines, functions, procedures, etc. "Instructions" and "code" may include a single computer-readable statement or many computer-readable statements.

Each of the processors 104, 114, 124, and 134 represents one or more general-purpose processing devices such as a microprocessor, central processing unit, or the like. More particularly, each of the processors 104, 114, 124, and 134 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Each of the processors 104, 114, 124, and 134 may also be one or more special-purpose processing devices such as an application specific integrated circuit (ASIC), a field programmable gate array (FPGA), a digital signal processor (DSP), network processor, or the like. Each of the processors 104, 114, 124, and 134 is configured to execute instructions for performing the operations and steps discussed herein.

In an embodiment, each of the memories 106, 116, 126, and 136 is a non-transitory computer-readable storage media which comprises all computer-readable storage media except for a transitory, propagating signal. Some common forms of computer-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read. For example, each of the memories 106, 116, 126, and 136 may be a floppy disk, a magnetic hard disk drive (HDD), a solid-state drive (SSD), or an optical memory (e.g., CD-ROM, DVD, and Blu-Ray Disc).

The tester device 112 is a computing device such as a personal computer (PC), a workstation, a tablet, or other computing devices. In an embodiment, the tester device 112 is operated by a testing engineer or an R&D engineer for testing or operating the DUT 102. The tester device 112 performs specific operations by the processor 114 and other components (not shown) by executing one or more sequences of instructions contained in the memory 116.

Each of the testing cloud server 122 and the statistics cloud server 132 enables users' access to a shared collection of computing resources including cloud storage and applications or services related to the testing of the DUT 102. For example, the testing cloud server 122 may host a web-enabled testing user interface for performing tests to the DUT 102, and may store testing command files and programs downloadable by the DUT 102 and/or the tester device 112. For example, the statistics cloud server 132 may store results of the testing of one or more DUTs 102 and may provide statistics to be queried by users. The cloud servers 122 and 132 perform specific operations by the processors 124 and 134 and other components (not shown) by executing one or more sequences of instructions contained in the memories 126 and 136, respectively.

The network 142 may include any combination of public and/or private networks. The network 142 may include one or more network devices that are communicatively coupled via transport media to communicate signals between the DUT 102, the tester device 112, the testing cloud server 122, and/or the statistics cloud server 132. In some examples, network devices include routers, hubs, switches, and so forth. In some examples, transport media include Ethernet cable, Fibre Channel Cable, wireless signals, Universal Serial Bus (USB) cable, and so forth. The DUT 102, the tester device 112, the testing cloud server 122, and the statistics cloud server 132 may each include a network interface component (not shown) that is structured to communicatively couple the respective devices 102, 112, 122, and 132 to the network 142. A network interface component may include, for example, a network interface card or other hardware and/or software component that allows a computing device to connect to the network 142. In an embodiment, the network 142 includes a Transport Control Protocol/Internet Protocol (TCP/IP) network (e.g., the Internet). In an embodiment, the connection between the DUT 102 and the tester device 112 may be a system bus internal to the DUT 102, for example, when the DUT 102 and the tester device 112 is physically one device.

Figure 2:
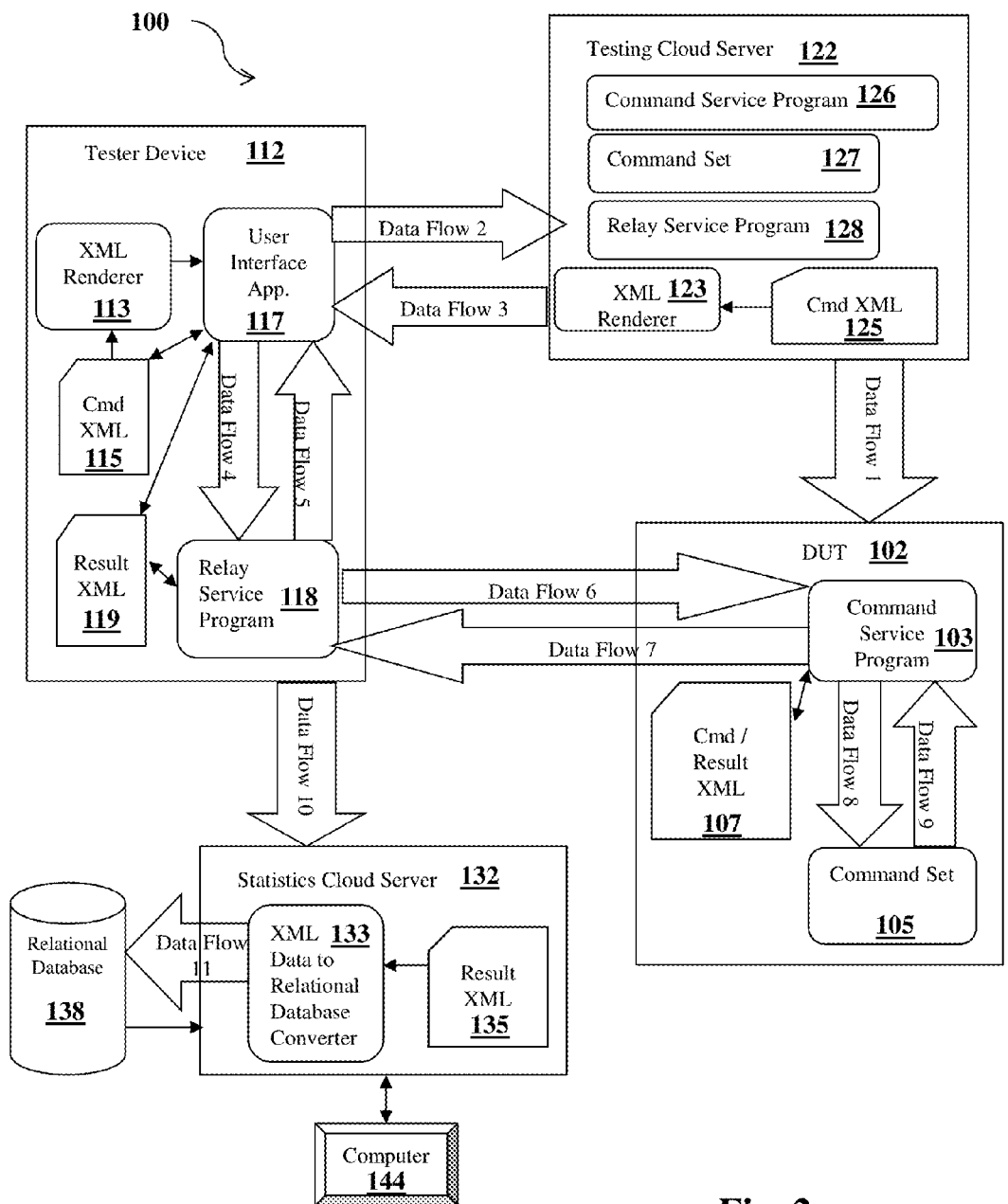
FIG. 2 illustrates various modules, files, and data flows that may be implemented by the mobile device testing system of FIG. 1, in accordance with an embodiment.

FIG. 2 illustrates various modules (or programs or applications), files, and data flows that may be implemented by the various components of the mobile device testing system 100, in accordance with an embodiment. In embodiments, a module may be implemented as a sequence of instructions stored in a memory such as the memories 106, 116, 126, and 136 and executable by a processor such as the processors 104, 114, 124, and 134. In embodiments, a file is structured to store contents that may be processed (e.g., read and/or written) by a module, which may include all or portions of relational databases, flat files, web services, and so forth. In a particular example, a file is a flat file having markups to structure contents therein. For example, special characters, delimiters, and/or other data (e.g., XML markup) may be included in a text to structure the contents. Data flow refers to communication between two or more components of the system 100 through the network 142. The various modules, files, and data flows of the system 100 are collectively discussed below with references to FIG. 2.

Referring to FIG. 2, the testing cloud server 122 includes or implements an XML renderer module 123 which is operable to render an XML sheet into a graphical user interface. The testing cloud server 122 may store a command XML sheet 125, pre-installed and sharable by multiple users. The testing cloud server 122 may also store various programs and files that can be downloaded and installed into the DUT 102 and/or the tester device 112, including a command service program 126, a command set 127, and a relay service program 128. In an embodiment, the command set 127 includes various testing commands which may be command-line commands (executable on command line). Testing commands are commands for testing the DUT 102, such as testSPI for testing Serial Peripheral Interface (SPI). The command set 127 may also include operational commands which are commands for operating, rather than testing, the DUT 102. For example, the command set 127 may include standard Linux commands such as "df" and "ls." These commands can be invoked on the DUT 102 and executed by the processor 104.

In the present embodiment, the command XML file 125 is an XML sheet that comprises elements corresponding to one or more commands in the command set 127. In a particular embodiment, the command XML file 125 comprises elements corresponding to one or more testing commands in the command set 127. In another word, the command XML file 125 is used for organizing various testing commands for performing tests to the DUT 102. The elements in the command XML file 125 comprise a name element corresponding to the name of a command and an argument element corresponding to the arguments required by the command. The command XML file 125 may organize the commands in terms of command groups which may be two or more levels of nested elements. An exemplary template 150 of the command XML file 125 is shown in FIG. 3.

Figure 3:
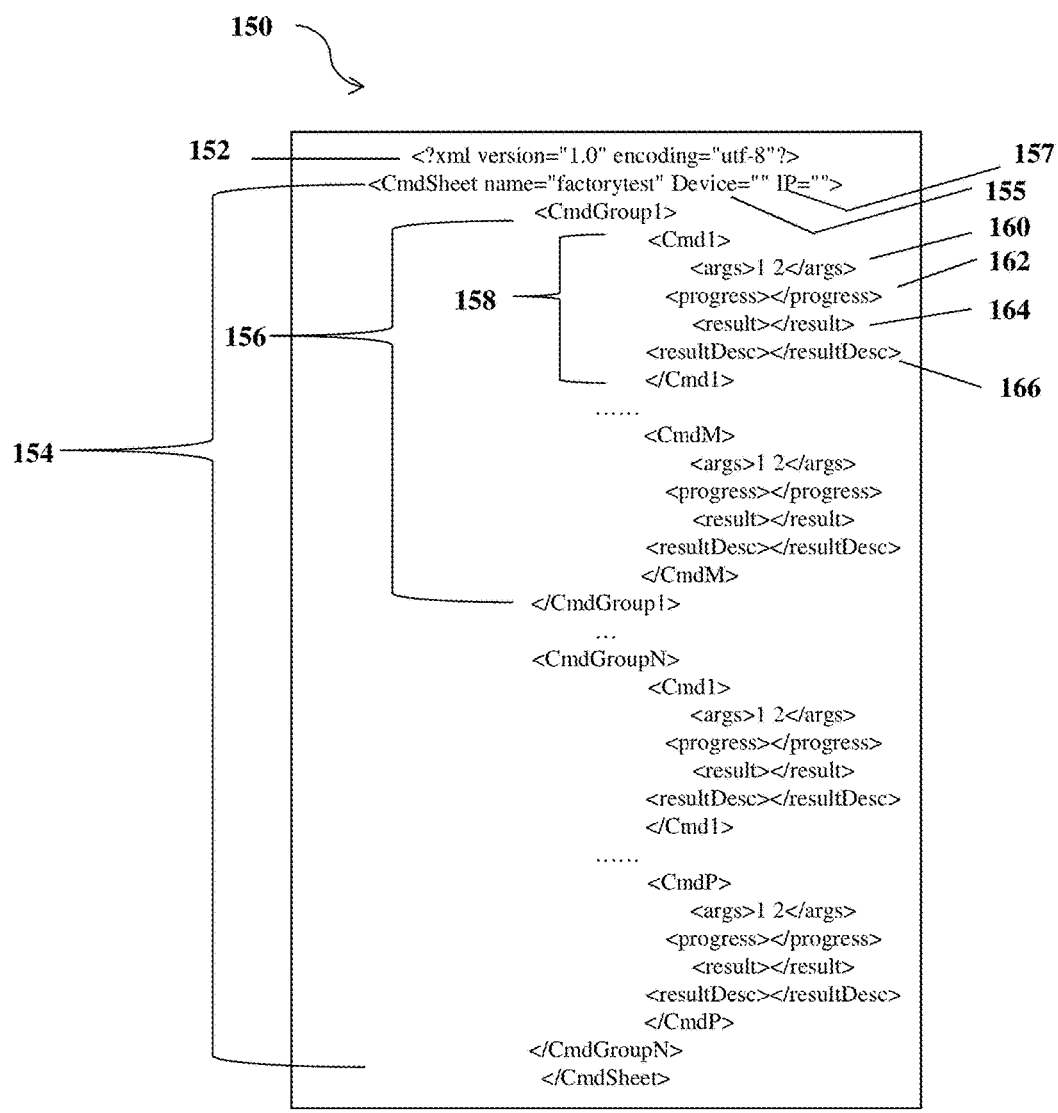
FIG. 3 illustrates an exemplary XML sheet that may be implemented by the mobile device testing system of FIG. 1 for organizing commands, in accordance with an embodiment.

Referring to FIG. 3, the template 150 includes a declaration 152 indicating the version of the XML (version 1.0 in the example) and the encoding (utf-8 in the example) to be used. The version may be any version currently available (such as XML 1.0 and XML 1.1) or future developed. The encoding may be any encoding scheme currently available (e.g., UTF-8 and UTF-16) or future developed. The template 150 includes a command sheet element 154 which begins with a start-tag <CmdSheet> and ends with a matching end-tag </CmdSheet>. In the example shown, the contents of the element 154 include a "name" field which is a string "factorytest" in this example. The name field is also the name of the XML file (such as the file name of the command XML file 125). The contents of the element 154 further include a "device" field 155 which may be filled with identification (ID) of the DUT 102, such as the ID of a mobile phone (e.g., IMEI or MEID of a mobile phone) in manufacturing testing. After the testing finishes, the execution program will fill in the device ID in the "device" field, indicating that the test results are produced by this device. The contents of the element 154 further include an "IP" field 157 which is the Internet Protocol (IP) address of the DUT 102. The "IP" field may be filled with "0.0.0.0" for locally testing the DUT 102 without using the Internet.

The contents of the command sheet element 154 further include one or more command group elements (child elements) 156, each of which begins with a start-tag <CmdGroupI> and ends with a matching end-tag </CmdGroupI> in the example shown, where "I" is an integer ranging from 1 to N in this example. Each command group element 156 includes one or more command elements (grandchild elements) 158, each of which begins with a start-tag <CmdJ> and ends with a matching end-tag </CmdJ> in the example shown, where "J" is an integer ranging from 1 to M in this example. The number of command elements 158 in each command group 156 may vary. In the present embodiment, the name of the tag for a command element matches the name of a command in the command set 127. For example "CmdI" may be "testSPI."

Each command element 158 may further include the following command property elements: argument 160, progress 162, result 164, and result description 166. The argument element 160 begins with a start-tag <args> and ends with a matching end-tag </args> in the example shown and includes as contents a list of arguments required by the specific command "CmdJ." A testing command may require no arguments, or require one or more arguments. The progress element 162 begins with a start-tag <progress> and ends with a matching end-tag </progress> in the example shown and may be used for showing the status of a command. This is particularly useful when a command takes long time to complete. The result element 164 begins with a start-tag <result> and ends with a matching end-tag </result> in the example shown and may be used for showing the result of a command, such as "pass" or "fail" or a binary number corresponding to "pass" or "fail." The result description element 166 begins with a start-tag <resultDesc> and ends with a matching end-tag </resultDesc> in the example shown and may be used for showing a detailed description of the result of a command in string format. In various embodiments, the template 150 may include other elements, other child elements, and other grandchild elements, or include further descendant elements.

Referring back to FIG. 2, in an exemplary operation for testing the DUT 102, a user (such as a test engineer) may download and install a copy of the command set 127 to the DUT 102 through Data Flow 1, and stores it locally as a command set 105. A user may also download and install a copy of the command service program 126 to the DUT 102 through Data Flow 1, and store it locally as a command service program 103. In an embodiment, the command set 105 and the command service program 103 are pre-installed in the DUT 102 at the factory, rather than downloaded from the testing cloud server 122. The functions of the command service program 103 will be explained later.

To further the exemplary operation, a user may enter the IP address of the testing cloud server 122 in a web browser such as Internet Explorer running on the tester device 112. Then, a webpage the testing cloud server 122 opens and allows the user to upload a command XML sheet 115 or to select a preloaded command XML sheet 125 through Data Flow 2. The command XML sheet 115 may use a template same as or substantially similar to the template 150. After uploading or selecting a command XML sheet, the XML renderer 123 renders the command XML sheet into a user interface (UI) application 117 and displays the UI on the website for the user to use. In the following discussion, the UI application 117 and the UI display are both referred to as the UI 117. The UI 117 is a layered interface corresponding to the command XML sheet 125 (or the command XML sheet 115), thereby providing a menu for testing. For example, the UI 117 may include the following fields:

(1) A field for entering the IP address of the DUT 102, or for entering "0.0.0.0" to perform tests by the DUT 102 itself (local testing), corresponding to the IP field 157.

(2) A list of command groups corresponding to the command groups 156. The UI 117 may have a button "Execute" (or "run" or an equivalent word) for sending a command message for all the commands in a command group. Alternatively, the UI 117 may have a button "Execute All Groups" for sending the command message of all commands in all command groups. A command message is an XML node path which is a string transferred in the network 142. For example, a command message may be:

"XmlNodePath::factorytest/CmdGroup1/Cmd1"

It means executing a command named "Cmd1" in a command group named "CmdGroup1" of a command XML sheet named "factorytest." Therefore, the command message can be used for locating the corresponding command in a command XML sheet. Another example of the command message is "XmlNodePath::factorytest/CmdGroup1" for executing all commands in the command group "CmdGroup1" of the command XML sheet "factorytest." Yet another example of the command message is "XmlNodePath::factorytest" for executing all commands in the command XML sheet "factorytest."

(3) A list of commands in each command group. The UI 117 may have a button "Execute" for sending out the command message of a command. Alternatively, the UI 117 may have a button "Execute All" for sending out the command messages of all commands in this command group. Further, the UI 117 may provide an input box for a command, allowing a user to provide the contents of the argument 160 of the command. Still further, the UI 117 may provide an output field for a command for displaying the result 164 and the result description 166 of the command.

In an embodiment, instead of using the testing cloud server 122, the tester device 112 may download a copy of the XML renderer 123 through Data Flow 3 or from another source, and store it locally on the tester device 112 as an XML renderer 113. In such a case, the tester device 112 may use the XML renderer 113 to render the command XML sheet 115 into the UI 117.

Continuing with the exemplary operation above, a user may enter the IP address of the DUT 102 and select one or more commands to be executed, and click the "Execute" button of the one or more commands Upon receiving the above user input(s), the UI 117 notifies a relay service program 118 using request API (Application Programming Interface) primitives, such as "send command message" request API and "send file message" request API.

The relay service program 118 is a module locally running on the tester device 112. It may be downloaded from the testing cloud server 122 using Data Flow 3 or from another source. Once receiving the request(s) from the UI 117, the relay service program 118 packs the command XML sheet 115 into a file message, encodes the testing request(s) into a command message, and sends the file message and the command message to the DUT 102 through Data Flow 6, for example using network sockets. If a file message has been previously sent to the same DUT, the relay service program 118 may optionally omit the file message and send the command message only. A file message is a string including all contents of an XML sheet. In an embodiment, it has the following format:

XMLFile::XMLFileDataString

For example, a file message of the command XML sheet 115 is a string where all contents of the command XML sheet 115 are concatenated. A command message has been described above, which can be used for locating one or more commands in the file message. A receiver of a file message and a command message can parse both messages and locate the commands to be executed.

Continuing with the exemplary operation above, the command service program 103 on the DUT 102 receives the file message and the command message through Data Flow 6. It may parse and reconstruct a command XML sheet 107 and store it locally. It also interprets the command message using the file message to figure out what commands are to be executed and to produce one or more command-line commands accordingly. For example, in Linux operating system, the command service program 103 may have the following code:

```
snprintf(buff, 256, "%s %s", nodename, nodeargs) // buff
is "nodename nodeargs"
fp=popen(buff,"r"); // execute the command buff, pipe the
results to fp
fgets(buf_resultdesc, 256, fp); // read the stream from fp
and stores the contents into
buf_resultdesc
```

In the above example, "nodename nodeargs" corresponds to a command pointed to by the command message, which also matches a command in the command set 105 by name. The command service program 103 invokes the command in the command set 105 by calling popen(buff, "r") through Data Flow 8. The command service program 103 obtains the results of the command through Data Flow 9 and stores it in the variable buf_resultdesc. The return value of the command depends on the return value of "popen" function. For example, if fp is NULL, the test has failed; and if fp is not NULL, the test has passed.

The command service program 103 may update the command XML sheet 107 with the respective results in the result element 164 and the result description element 166 (FIG. 3). In an embodiment, the command service program 103 may create multiple copies of the command XML sheet 107 where it keeps a copy of the command XML sheet 107 without results and uses another copy for storing the results. The command service program 103 sends test results in the form of a result message to the relay service program 118 through Data Flow 7, for example, using network sockets. In the present embodiment, a result message is an XML node with the following format:

```
"XmlNode::factorytest/CmdGroup1/Cmd1::
    <args>1 2</args>
    <progress></progress>
    <result></result>
    <resultDesc></resultDesc>"
```

In addition, the command service program 103 may send a test progress status in the form of a progress message to the relay service program 118 through Data Flow 7. In the present embodiment, a progress message is a real-time feedback of the testing progress (or status), with a format like below:

XmlNodeProgress::factorytest/CmdGroup1/Cmd1::60
Here, "60" indicates a percentage (60% in this example) of completion of the one or more commands requested by the user.

After receiving a result message and/or a progress message, the relay service program 118 updates a locally stored result XML sheet 119 with the results and notifies the UI 117 of the receipt of the result message and/or progress message through Data Flow 5, for example, using API. In an embodiment, the result XML sheet 119 is a copy of the command XML sheet 115 and may be stored locally under a directory named after the ID or IP of the DUT 102. This makes it convenient for collecting testing data related to a specific DUT 102. After receiving the notification from the relay service program 118, the UI 117 updates its display using the results and progress status accordingly.

After certain results have been collected, a copy of the result XML sheet(s) 119 may be sent to the statistics cloud server 132 as data islands. The statistics cloud server 132 may store them as one or more result XML sheets 135 on the server. The server 132 provides users with access to a database 138. In the present embodiment, the database 138 is a relational database. The server 132 also provides an XML data to relational database converter 133. The converter 133 can convert the test results stored in the result XML sheets 135 into data (or data entry) in the relational database 138. The converter 133 may be accomplished by an XML-relational database converter. A field in a basic data in the database 138 may be defined as:

CmdSheet name
Device
IP
CmdGroup
Cmd args
result
resultDesc

A user, through a computer 144, can collect various kinds of testing data from the statistics cloud server 132, such as target device failure rates, target device passing rates, failure rate of a specific testing command, passing rates of a type of target devices, or production data of a specific factory. For example, the name of a result XML sheet 135 may correspond to a particular type of device in a particular factory. A query about this result XML sheet gives the testing statistics about this type of devices in this factory. It can even be as detailed as which device had failed a particular test.

Figure 4:
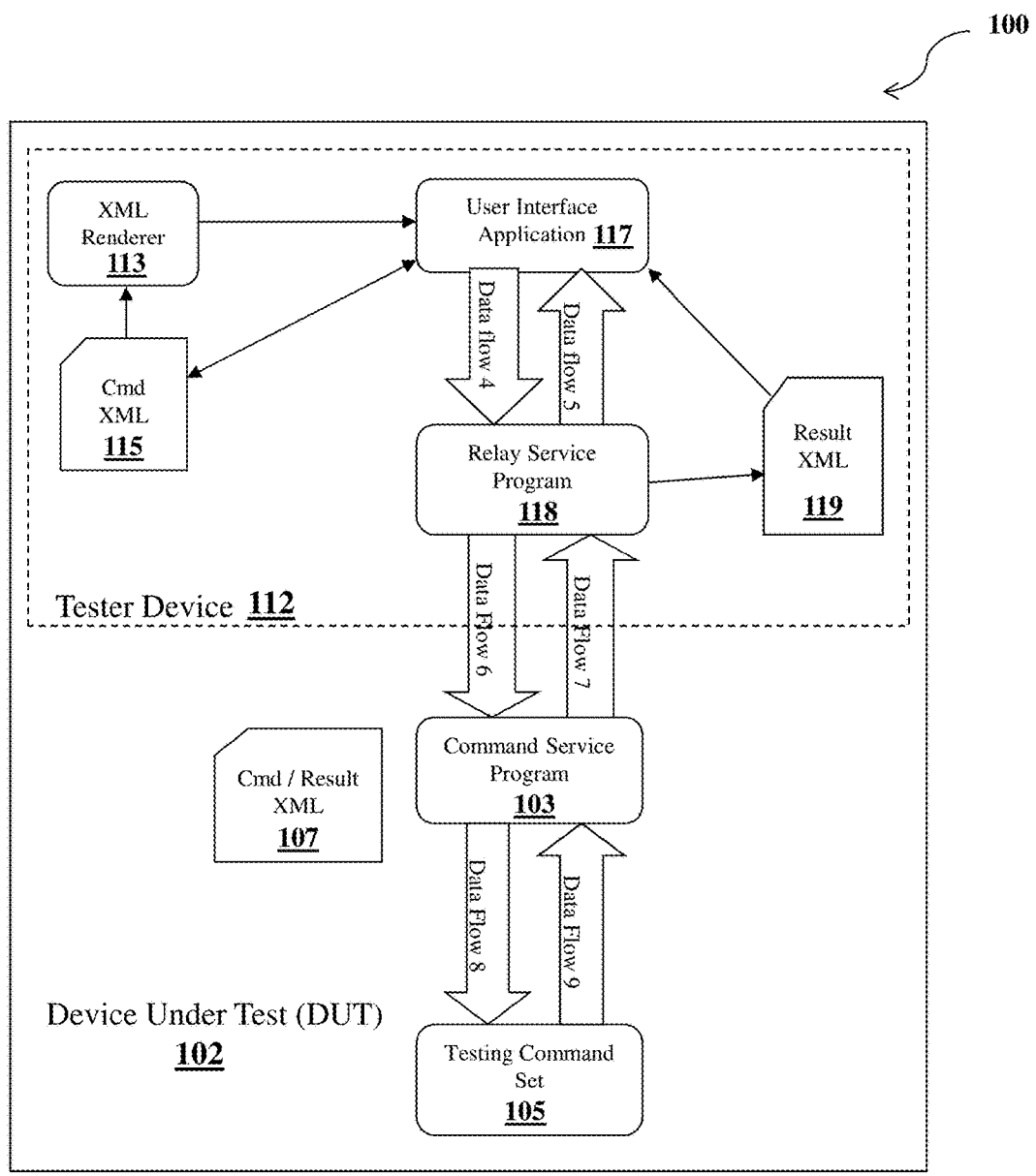
FIG. 4 illustrates various modules, files, and data flows that may be implemented by the mobile device testing system, in accordance with another embodiment where a mobile device is tested locally by and on the mobile device itself.

FIG. 4 is another embodiment of the mobile device testing system 100, constructed according to aspects of the present disclosure. Referring to FIG. 4, the system 100 in this embodiment represents a scenario for a mobile device local testing, i.e., the tester device 112 and the DUT 102 is physically one device. The various modules, files, and data flows have same or substantially similar features as discussed above with respect to FIG. 2. The components of the tester device 112 and the DUT 102 are implemented using the processors 104 and the memory 106 (FIG. 1). The connection between the relay service program 118 and the command service program 103 becomes local connection, for example, using a system bus of the DUT 102. The various modules and files may be pre-stalled in factory or downloaded from a server such as the testing cloud server 122.

FIGS. 5A, 5B, 6A, 6B, 7A, 7B, and 7C illustrate flow charts of a computer-implemented method 200 for testing a mobile device, constructed in accordance with some embodiments of the present disclosure. The method 200 is an example, and is not intended to limit the present disclosure beyond what is explicitly recited in the claims. Additional operations can be provided before, during, and after the method 200, and some operations described can be replaced, eliminated, or relocated for additional embodiments of the method. In the present embodiment, the method 200 is implemented in a mobile device testing system, such as the system 100. For the purposes of illustration, the method 200 is described below in conjunction with FIGS. 2-3 and 5A-7C, wherein the method 200 is implemented in the system 100, in accordance with some embodiments.

Figure 5A:
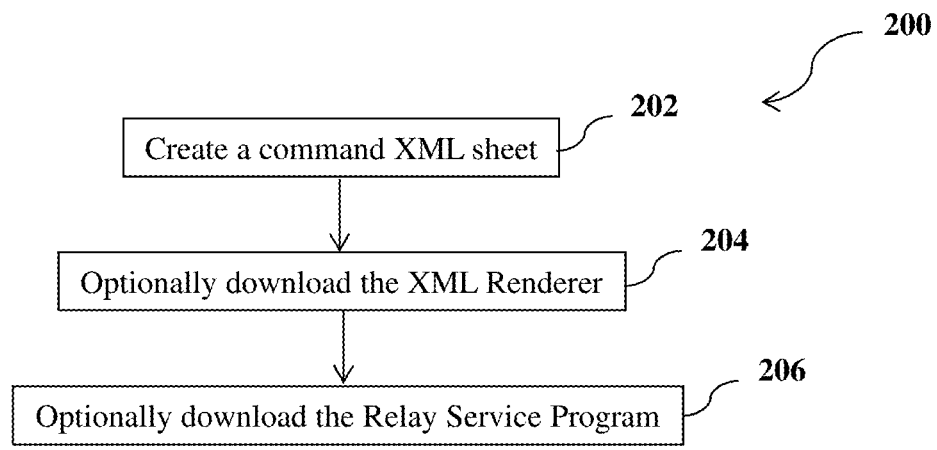
FIGS. 5A, 5B, 6A, 6B, 7A, 7B, and 7C illustrate flow charts of a computer-implemented method for testing a mobile device, constructed in accordance with some embodiments of the present disclosure.

Referring to FIG. 5A, at operation 202, the method 200 creates a command XML sheet, such as the command XML sheet 115 or 125. The command XML sheet may be manually created by a user or automatically created by a computer program. The command XML sheet follows a user-defined format, such as the template 150 in FIG. 3. The command XML sheet comprises elements corresponding to one or more commands that have been developed for testing or operating a mobile device, such as the DUT 102. The commands can be executed by components on the mobile device, such as by the processor 104 and other components. The command XML sheet may be stored in a non-transitory memory such as the memory 116 or 126. At operation 204, the method 200 downloads an XML renderer 113 to the tester device 112 from the testing cloud server 122 or from another source. In an embodiment, the XML renderer 113 is stored in the memory 116 and can be run by the processor 114 as a sequence of instructions. If the XML renderer 113 already exists on the tester device 112, then operation 204 may be skipped (thus optional). The XML renderer 113 can render a command XML sheet into a user interface (UI) application 117. At operation 206, the method 200 downloads the relay service program 118 to the tester device 112 from the testing cloud server 122 or from another source if the relay service program 118 does not already exist on the tester device 112. In an embodiment, the relay service program 118 is stored in the memory 116 and can be run by the processor 114 as a sequence of instructions.

Figure 5B:
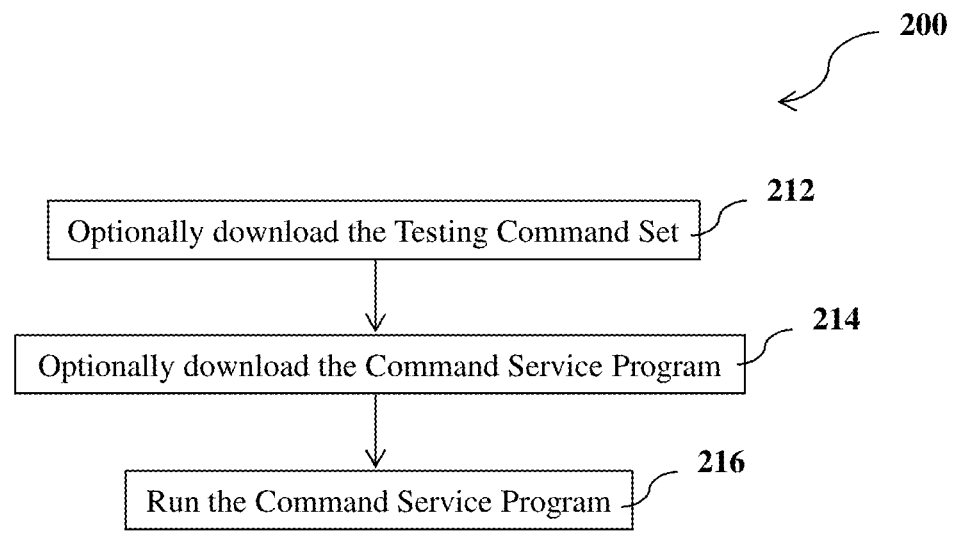

Referring to FIG. 5B, at operation 212, the method 200 downloads and installs the command set 105 to the DUT 102 from the testing cloud server 122 or from another source. If the DUT 102 already has the command set 105 installed, then operation 212 may be skipped. At operation 214, the method 200 downloads and installs the command service program 103 to the DUT 102 from the testing cloud server 122 or from another source. If the DUT 102 already has the command service program 103 installed, then operation 214 may be skipped. In an embodiment, each of the command set 105 and the command service program 103 is stored the memory 106 and can be run by the processor 104 as a sequence of instructions. At operation 216, the method 200 invokes (or runs) the command service program 103.

Figure 6A:
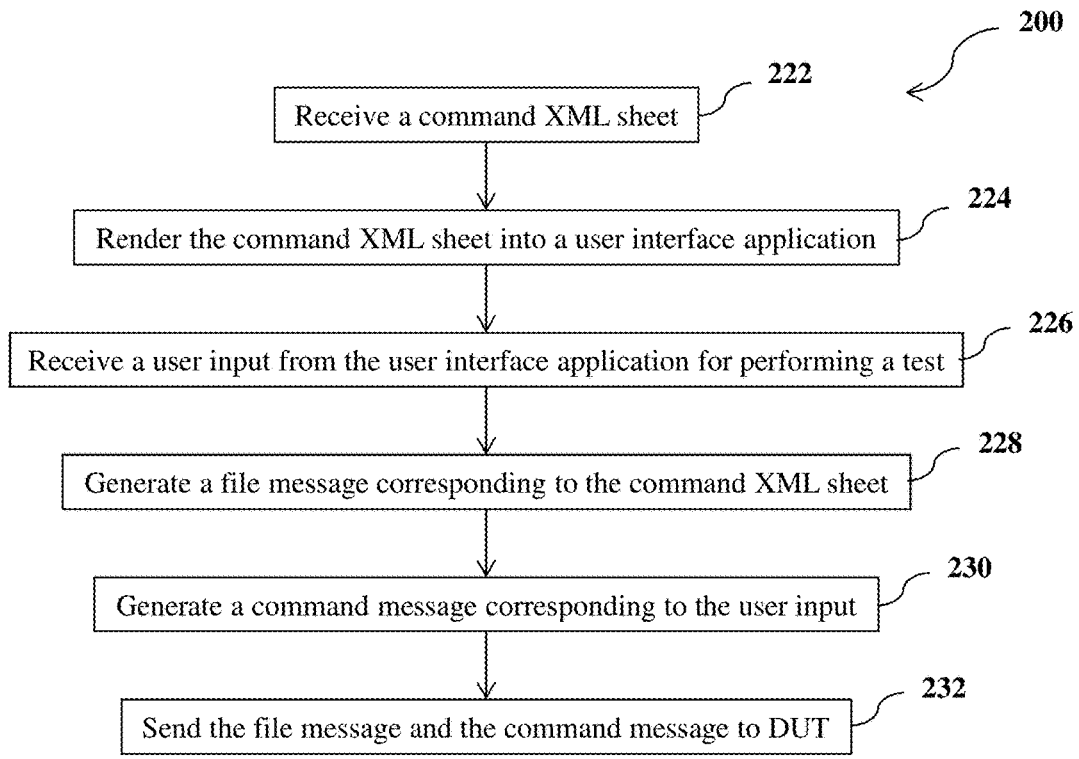

Referring to FIG. 6A, at operation 222, the method 200 receives a command XML sheet such as the command XML sheet 115 or the command XML sheet 125. In an embodiment, the command XML sheet is created at the operation 202. The command XML sheet may be received through a webpage. At operation 224, the method 200 renders the command XML sheet into a user interface application such as the UI 117. The operation 224 may be performed by the XML renderer 113 or the XML renderer 123. At operation 226, the method 200 receives a user input from the user interface application for performing a test (or multiple tests in a batch) or an operation to the DUT 102. At operation 228, the method 200 generates a file message corresponding to the command XML sheet. In an embodiment, the file message is a string formed by concatenating all contents in the command XML sheet. At operation 230, the method 200 generates a command message corresponding to the user input. In an embodiment, the command message is an XML node path that indicates which command, command group (a group of commands), or command sheet (a group of command groups) is to be executed on the DUT 102. At operation 232, the method 200 sends the file message and the command message to the DUT 102 through a communication channel. If the file message had been sent to the same DUT previously, the operation 232 may send the command message only to reduce transaction time. In embodiments, the communication channel may be Internet, a USB cable, an internal system bus, or other suitable communication medium. In an embodiment, each of the operations 228, 230, and 232 is performed as a sequence of instructions on a processor such as the processor 114 or the processor 124.

Figure 6B:
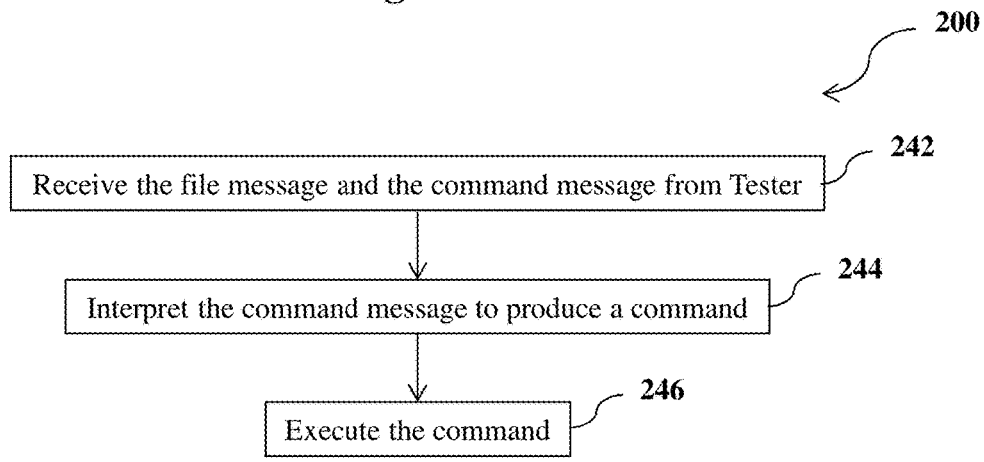

Referring to FIG. 6B, at operation 242, the method 200 receives the file message and the command message that are sent in the operation 232. In an embodiment, the file message and the command message are sent from the tester device 212. At operation 244, the method 200 parses (or interprets) the command message using the file message or a previously received file message. The method 200 determines which command, command group, or command sheet is to be executed and produces one or more command-line commands accordingly. At operation 246, the method 200 invokes the one or more command-line commands which in turn invoke(s) the appropriate command(s) in the command set 105. In an embodiment, each of the operations 242, 244, and 246 is performed as a sequence of instructions on a processor such as the processor 104.

Figure 7A:
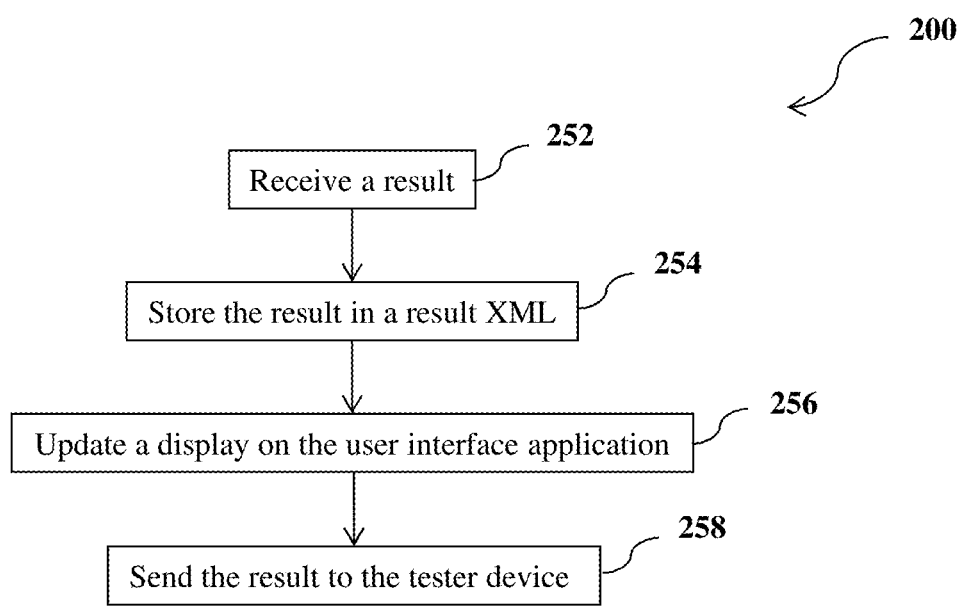

Referring to FIG. 7A, at operation 252, the method 200 receives results (or outputs) from the executing of the one or more commands on the DUT 102. The results may indicate pass or fail status of the commands, and may contain a description of the respective status. At operation 254, the method 200 stores the results in a result XML sheet, such as the result XML sheet 107. In another word, it updates the result XML sheet with the results. In an embodiment, the tester device 112 and the DUT 102 are on the same device. To further this embodiment, the method 200 updates a display on the user interface application at operation 256 with the results received at the operation 252. At operation 258, the method 200 sends the results to the tester device 112 using a communication channel which may be Internet, a USB cable, an internal system bus, or other suitable communication medium. In an embodiment, the results are encoded into a result message which is an XML node, as discussed above. In an embodiment, each of the operations 252, 254, 256, and 258 is performed as a sequence of instructions on a processor such as the processor 104.

Figure 7B:
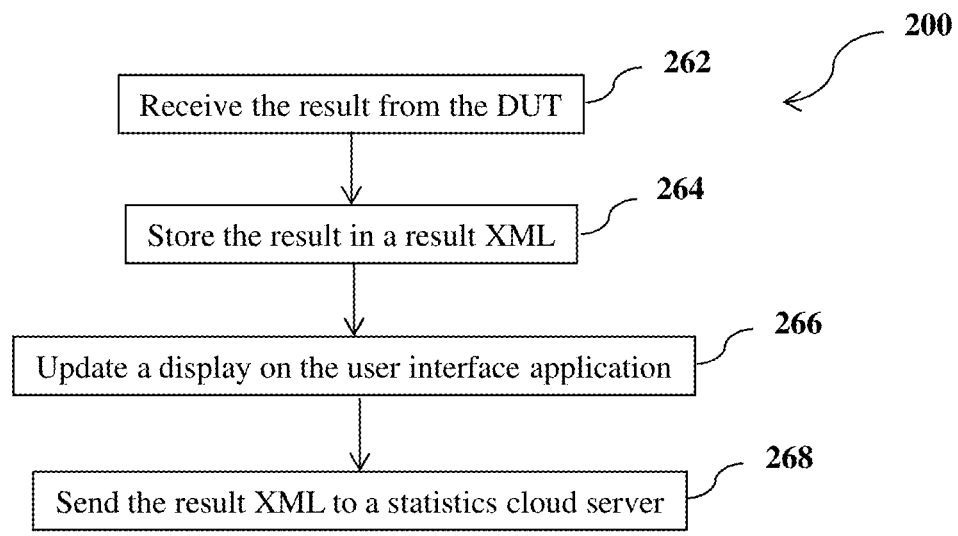

Referring to FIG. 7B, at operation 262, the method 200 receives the result from the DUT 102. In an embodiment, the result is encoded into a result message. To further this embodiment, the operation 262 decodes the result message and obtains the contents of the result and the respective result description. At operation 264, the method 200 stores the result in a result XML sheet, such as the result XML sheet 119. If the result XML sheet does not already exist, the method 200 creates one by copying the command XML sheet, and updates the new result XML sheet with the result. At operation 266, the method 200 updates a display on the UI 117 with the result and the respective test result description. In an embodiment, the method 200 updates a display on the UI 117 with a progress message, as discussed above. At operation 268, the method 200 sends one or more result XML sheets to a statistics cloud server, such as the statistics cloud server 132. In an embodiment, each of the operations 262, 264, 266, and 268 is performed as a sequence of instructions on a processor such as the processor 114.

Figure 7C:
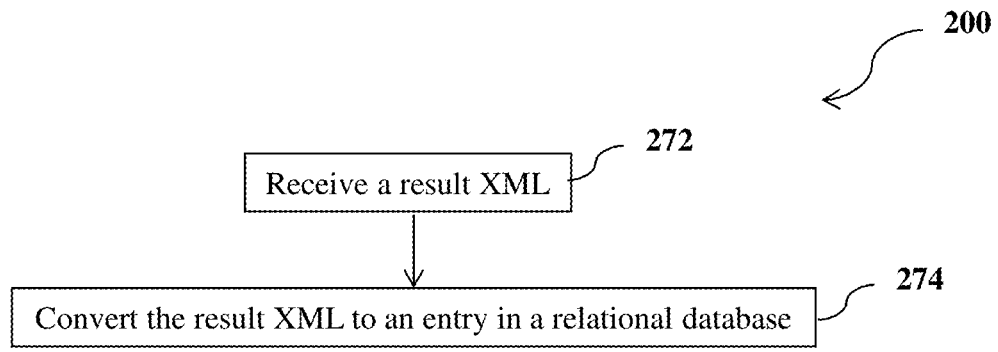

Referring to FIG. 7C, at operation 272, the method 200 receives one or more result XML sheets as data islands. At operation 274, the method 200 converts some contents of the one or more result XML sheets into one or more data entries in a relational database, such as the relational database 138. In an embodiment, each of the operations 272 and 274 is performed as a sequence of instructions on a processor such as the processor 134.

Although not intended to be limiting, one or more embodiments of the present disclosure provide many benefits for mobile device testing. First, testing user interfaces (e.g., the UI 117) are automatically generated by a computer (e.g., the testing cloud server 122 and/or the tester device 112). The testing user interface can be reversely generated using XML command tree from a command XML sheet. Once generated, the testing user interface codes do not depend on the testing commands. Therefore, the testing interfaces can be reused without modification and recompilation, and is virtually maintenance-free. Second, testing user interfaces can be stored in cloud storage or stored in a local computer. If the testing user interfaces are stored in cloud storage, the user does not need to install new software into his/her local computer and can simply go to a webpage to locate the testing user interface. This enables web-based mobile device testing. The same testing commands and testing user interface can be shared among users in a factory or in different factories. Third, adding a new test command does not require the testing user interfaces or application software to be modified. The user only needs to modify an XML file (e.g., the command XML file 115 or 125). Fourth, a user may locally operate a mobile device for testing or remotely operate a mobile device for testing by entering the IP address of the mobile device. In a remote testing, the mobile device user may manually invoke the command service program 103 or the mobile device factory may pre-install the command service program 103 and run it at system start-up phase, for example, by adding it in an initialization program. Therefore, testing a mobile device does not need a test engineer to be onsite with a customer. Fifth, the architecture of the system 100 is flexible. It can be used remotely (discussed above) or locally in a factory or in an R&D lab even without Internet. For example, the tester device 112 may communicate with the DUT 102 through a USB cable. Sixth, the system 100 enables statistics collection where result XML sheets can be passed to a statistics cloud server as data islands. Mobile device factories can monitor the testing and production of mobile devices remotely through the statistics cloud server.

The foregoing has outlined features of several embodiments. Persons having ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A mobile device testing system, comprising:
a first non-transitory memory;
one or more first hardware processors coupled to the first non-transitory memory, the one or more first hardware processors to execute instructions to perform first operations comprising:
receiving a command XML sheet;
rendering the command XML sheet to create a user interface application, wherein the command XML sheet comprises elements corresponding to one or more commands;
receiving a user input through the user interface application for performing one of the one or more commands;
generating a file message, wherein the file message includes information contained in the command XML sheet; and
generating a command message in response to the user input, wherein the command message locates the one of the one or more commands in the file message.

2. The mobile device testing system of claim 1, the first operations further comprising:
executing the one of the one or more commands in response to the user input.

3. The mobile device testing system of claim 2, before the executing of the one of the one or more commands, the first operations further comprising:
interpreting the command message using the file message.

4. The mobile device testing system of claim 1, further comprising:
a second non-transitory memory;
one or more second hardware processors coupled to the second non-transitory memory, the one or more second hardware processors to execute instructions to perform second operations comprising:
receiving the file message;
receiving the command message;
producing the one of the one or more commands using the command message and the file message;
executing the one of the one or more commands;
receiving a result of the one of the one or more commands; and
sending the result to the one or more first hardware processors.

5. The mobile device testing system of claim 4, the first operations further comprising:
receiving the result; and
updating a display on the user interface application in response to the result.

6. The mobile device testing system of claim 4, the first operations further comprising:
receiving the result; and
updating a result XML sheet stored in the first non-transitory memory with the result.

7. The mobile device testing system of claim 6, further comprising:
a third non-transitory memory;
one or more third hardware processors coupled to the third non-transitory memory, the one or more third hardware processors to execute instructions to perform third operations comprising:
receiving the result XML sheet; and
converting the result XML sheet into at least one entry in a relational database.

8. The mobile device testing system of claim 4, further comprising:

a third non-transitory memory;
one or more third hardware processors coupled to the third non-transitory memory, the one or more third hardware processors to execute instructions to perform third operations comprising:
hosting a website accessible by the one or more first hardware processors;
receiving another command XML sheet through the website; and
rendering the another command XML sheet into another user interface application.

9. A mobile device testing system, comprising:
a first non-transitory memory;
one or more first hardware processors coupled to the first non-transitory memory, the one or more first hardware processors to execute instructions to perform first operations comprising:
receiving a file message, wherein the file message comprises command definitions corresponding to one or more testing commands;
receiving a command message;
interpreting the command message using the command definitions, thereby producing a testing command;
executing the testing command;
receiving a result of the testing command; and
storing the result in the first non-transitory memory as a result XML sheet.

10. The mobile device testing system of claim 9, wherein the file message is an XML sheet and the command message is an XML node path.

11. The mobile device testing system of claim 9, the first operations further comprising:
receiving a command XML sheet;
rendering the command XML sheet into a user interface application, wherein the file message includes information contained in the command XML sheet;
receiving a user input through the user interface application for performing the testing command; and
generating the file message and the command message in response to the user input.

12. The mobile device testing system of claim 11, the first operations further comprising:
receiving a result of the testing command; and
updating a display on the user interface application in response to the result.

13. The mobile device testing system of claim 9, further comprising:
a second non-transitory memory;
one or more second hardware processors coupled to the second non-transitory memory, the one or more second hardware processors to execute instructions to perform second operations comprising:
receiving a command XML sheet;
rendering the command XML sheet into a user interface application, wherein the file message includes information contained in the command XML sheet;
receiving a user input through the user interface application for performing the testing command; and
generating the file message and the command message in response to the user input.

14. The mobile device testing system of claim 13, the second operations further comprising:
sending the file message and the command message to the one or more first hardware processors using network sockets;
receiving a result of the testing command from the one or more first hardware processors using network sockets;
updating a result XML sheet stored in the second non-transitory memory; and
updating a display on the user interface application in response to the result.

15. A computer-implemented method for testing a mobile device, comprising:
receiving a command XML sheet;
rendering the command XML sheet to create a user interface application, wherein the command XML sheet comprises elements corresponding to one or more commands;
receiving a user input through the user interface application for performing one of the one or more commands;
generating a file message, wherein the file message includes information contained in the command XML sheet;
generating a command message, wherein the command message locates the one of the one or more commands in the file message; and
executing the one of the one or more commands in response to the user input.

16. The computer-implemented method of claim 15, before the executing of the one of the one or more commands, further comprising:
parsing the command message using the file message.

17. The computer-implemented method of claim 15, further comprising:
receiving a result of the executing of the one of the one or more commands; and
performing at least one of:
updating a display on the user interface application in response to the result; and
updating a result XML sheet with the result, the result XML sheet stored in a non-transitory memory.

18. The computer-implemented method of claim 15, wherein the receiving of the user input is performed on a tester device and the executing of the one of the one or more commands is performed on a device under test that is different from the tester device.

* * * * *